(No Model.) 3 Sheets—Sheet 1.
A. COLLMANN.
VALVE GEAR.
No. 502,615. Patented Aug. 1, 1893.
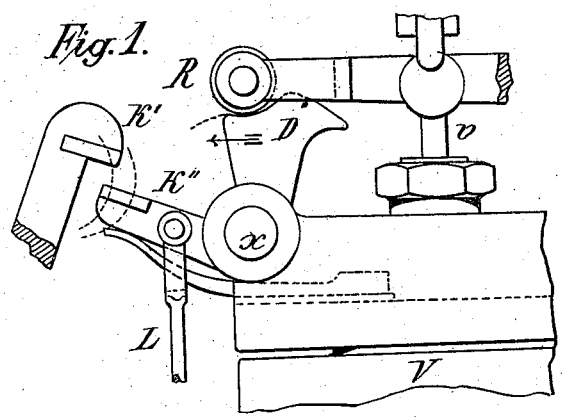
Fig. 1.
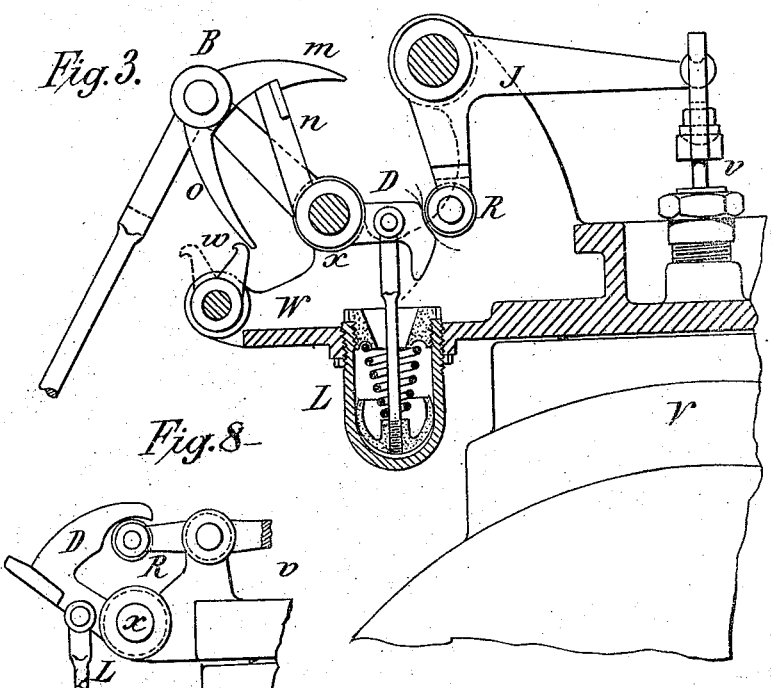
Fig. 3.
Fig. 8.
Witnesses.
Louis P. Keller
J. Chalmers Wilson
Inventor
Alfred Collmann
by Whitman & Wilkinson,
Attorneys.

(No Model.) 3 Sheets—Sheet 2.
A. COLLMANN.
VALVE GEAR.

No. 502,615. Patented Aug. 1, 1893.

Witnesses.
Louis P. Keller
J. Chalmers Wilson

Inventor.
Alfred Collmann
by Whitman & Wilkinson
Attorneys.

(No Model.)  
A. COLLMANN.  
VALVE GEAR.

No. 502,615. Patented Aug. 1, 1893.

3 Sheets—Sheet 3.

Witnesses.  
Louis P. Keller  
J. Chalmers Wilson

Inventor.  
Alfred Collmann  
by Whitman & Wilkinson,  
Attorneys.

UNITED STATES PATENT OFFICE.

ALFRED COLLMANN, OF VIENNA, AUSTRIA-HUNGARY.

VALVE-GEAR.

SPECIFICATION forming part of Letters Patent No. 502,615, dated August 1, 1893.

Application filed March 7, 1893. Serial No. 464,939. (No model.) Patented in Austria-Hungary November 16, 1892, No. 3,828 and No. 44,876.

*To all whom it may concern:*

Be it known that I, ALFRED COLLMANN, a subject of the Queen of Great Britain, and a resident of the city of Vienna, Austria-Hungary, have invented certain new and useful Improvements in Valve-Gears, (for which I have obtained Letters Patent in Austria-Hungary, dated November 16, 1892, No. 3,828 and No. 44,876,) of which the following is a specification.

This improvement in steam engine valve gears has for its object to provide for a positive but sudden closing of the admission valves for any desired expansion of steam, and for this purpose it consists in the construction, arrangement and combination of the several parts of which it is composed as will be hereinafter more fully described and claimed.

Figure 2:
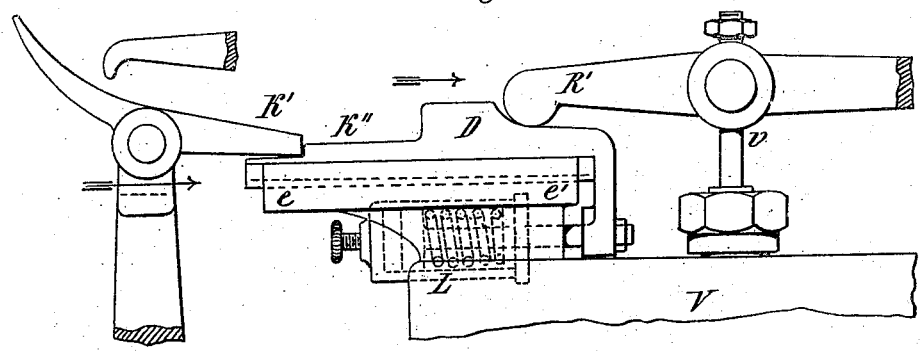
Figure 4:
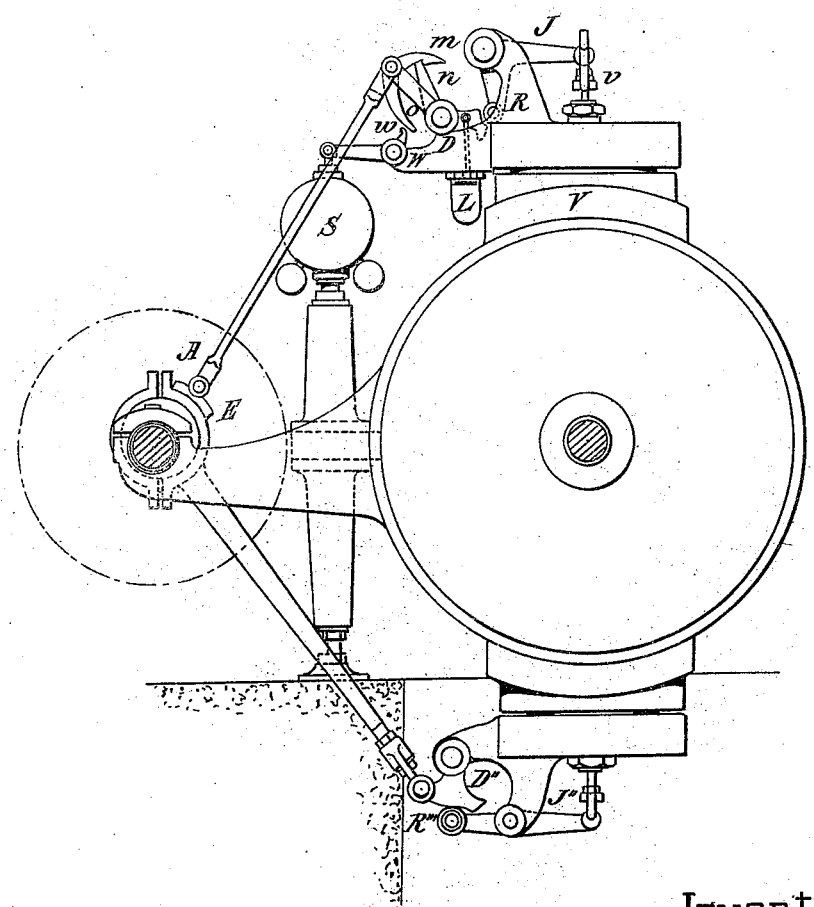
Figure 5:
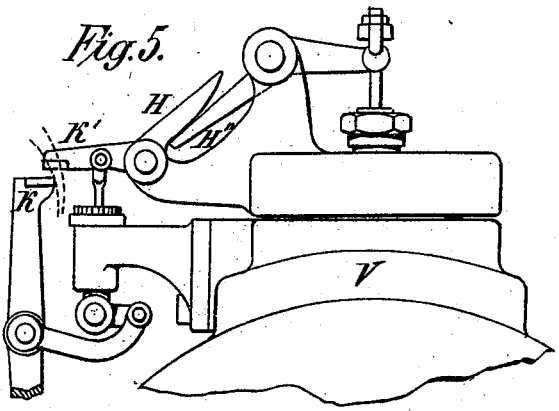
Figure 6:
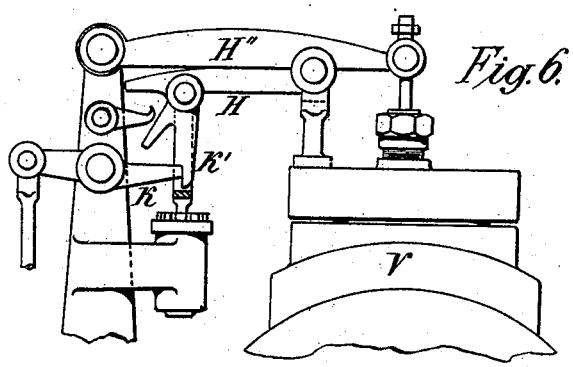
Figure 7:
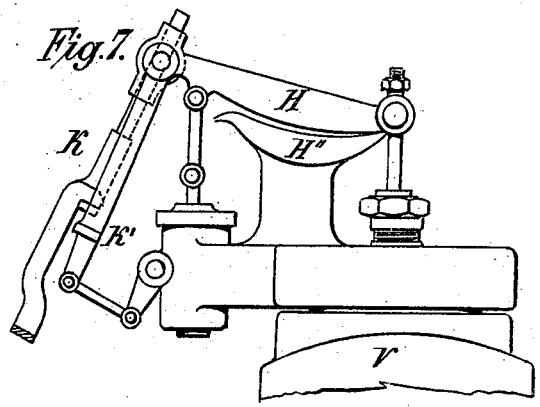

Referring to the accompanying drawings, in which corresponding parts are designated by similar marks of reference: Figure 1 is a side view of a form of my invention, in which a pivoted driven cam is used to actuate the valve. Fig. 2 is a corresponding view of a form in which a reciprocating driven cam is employed. Fig. 3 is a detail view of parts shown in Fig. 4. Fig. 4 is a side view of mechanism in which the catch is shown as actuated by an eccentric. Figs. 5, 6, and 7 show modifications in which the varying speed of the movement of the piston is accomplished by the varying position of the bearing point between two surfaces. Fig. 8 is a modification in which an internal, instead of the external cam shown in Fig. 1, is used.

By any releasable catch gear the cam D is either rocked on its axis $x$ Fig. 1 or reciprocated along a guide $e\ e'$ Fig. 2 whereby a roller R Fig. 1 or a stop R' Fig. 2 connected with the valve stem $v$ either directly or through the medium of an intermediate lever gear, is so actuated that the valve at V is operated in the following manner: At first the valve is slowly raised a little, then being raised very rapidly to the full height of its stroke in which position it remains approximately to the moment of closing. When the catch gear (for instance by catches K' K'') releases the rocking or the reciprocating cam D Figs. 1 or 2 at any desired moment, the cam D is suddenly moved backward either by a weight, steam or spring pressure. Owing to the pressure closing the valve the roller R or stop R' bears constantly against the working surface of the cam D and the latter is so shaped that the downward movement of the valve is very rapid at first and is very much retarded toward the end of the valve stroke, so that the valve is brought home onto its seat without any shock. After the closing of the valve the cam D continues to move backward entirely leaving free the roller R or stop R'. This backward movement of cam D is suitably controlled by a dash pot arranged at L containing air, oil or other fluid. The cam D rocking on the axis $x$ or reciprocating along guides may also be so arranged that its working surface is on the inside (for instance toward the axis $x$) as shown in Fig. 8. Instead of guiding the cam D on fixed slides or round an axis $x$ the cam D can also be guided by a link gear either in a straight or in a curved line. A special arrangement of this valve gear is shown in Figs. 3 and 4. An eccentric E Fig. 4 operates, through the medium of a cam D'', roller R''' and lever J'', the exhaust valve. The motion of the valve gear rod AB is either so derived from an eye A on the exhaust eccentric E, or from a separate eccentric, that the link B is moved downward during the action of the catch gear. When the link B has nearly reached its highest position shown in Fig. 3 the catch pawl $m$ engages with the end of the arm $n$ of cam D without any shock. If desired a spring may be used to assist in making this engagement of the catches quite noiseless. Now when the link B moves downward the cam D acts upon the roller R and the valve V is raised by the lever J, at first slowly and then very rapidly to its full stroke which is about the same for all degrees of expansion. By the expansion shaft W connected with the governor S Fig. 4 the stop $w$ is suitably adjusted, and the catch pawl $m$ is released from the arm $n$ by means of the arm $o$ connected with the said pawl striking against the stop $w$ at the proper moment. A spring or weight in combination with a dash pot L now suddenly turns back the cam D so that the roller R bearing against this cam D together with the intermediate lever gear causes the valve at V to be closed positively and almost instantaneously which movement is very rapid at first and very much retarded toward the end of the valve stroke, this taking place for any desired degree of expansion. At all degrees of cutoff the valve reaches the full opening stroke and the roller R bears against that portion of the working surface of the cam D which is concentric with the axis $x$ Fig. 1 or parallel to the guide $e\ e'$ Fig. 2 and therefore the pressure tending to close the valve does not react upon the catch gear, and therefore the releasing of the latter is effected without any appreciable resistance.

The advantages of the combined catch and cam valve gear are the following: soft and quiet engagement of the catch pawls, soft lifting off, and very rapid raising of the valve to its full stroke (which is the same for all usual degress of expansion) and instantaneous but positive closing motion of the valve with a soft set home onto the valve seats, an almost resistanceless releasing of the catch gear and therefore a very low resistance to the governor and very delicate governing with very small governors.

Another method to obtain a similar action of the valve gear is shown in Figs. 5, 6 and 7. Any desired catch gear actuates the lever H Figs. 5, 6 and 7 and raises the admission valve V connected with lever H Fig. 7 or with lever H″ Figs. 5 and 6 at first slowly but then very rapidly owing to the shifting of the point of contact between the two levers H and H″. Now when the catch gear is released, the reverse action will be produced. By means of weights, steam or spring pressure in connection with an air or oil dash pot the valve is closed first rapidly, then retarded in an instantaneous but positive way by means of the shifting of the point of contact between the levers H and H′, and the valve is softly brought home on its seat. The levers H H″ may be arranged opposite each other, as in Fig. 5, or the one below the other as in Fig. 6, or the lever H″ may be replaced by a fixed curved bearing surface H″ as in Fig. 7. Also in this gear the lever H actuated by the catch gear continues to move on after the closing of the valve and leaves the valve quite free.

I claim—

1. The combination with a lifting valve and valve stem, of a lever connected to the said valve stem, a reciprocating cam having a cam face of increasing curvature bearing on the said lever, a catch adapted to move the cam in one direction and to release it, and means for returning cam, substantially as described.

2. The combination with a lifting valve and valve stem, of a lever connected to the said valve stem, a cam having a cam face of increasing curvature bearing on the said lever, a catch adapted to retract the said cam, a detent adapted to disengage the catch from the said cam, and means for returning the cam, substantially as described.

3. The combination with a lifting valve and valve stem, of a lever connected to the said valve stem, a cam having a cam face of increased curvature bearing on the said lever, a catch adapted to retract the said cam, a governor, a detent connected therewith and moved thereby, and adapted to disengage the catch from the said cam and means for returning the cam, substantially as described.

4. The combination with a steam valve V and valve stem $v$, of a lever J, having one arm connected to said valve stem, a cam D, bearing on the opposite end of the said lever, a dash pot connected with the said cam, a catch adapted to engage the said cam, an eccentric connected with the said catch and retracting it, a governor, and a detent controlled by the said governor and releasing the said catch from the said cam, substantially as described.

5. The combination with the steam valve V and valve stem $v$, of the bell crank lever J, having one arm connected to said valve stem and the other arm provided with a roller; the cam D and dash pot L connected thereto, an eccentric and catch operated thereby for reciprocating said cam D; the exhaust valve and stem, the lever J″ connected at one end to said exhaust valve stem and provided with a roller R‴ at the other end; the pivoted cam D″ adapted to engage said roller R‴, and an eccentric rod connecting said eccentric, and cam D″ whereby a variable motion is given to both steam and exhaust valves, substantially as and for the purposes described.

In testimony whereof I have affixed my signature in presence of two witnesses.

ALFRED COLLMANN.

Witnesses:
F. BELMONT,
A. SCHLESSING.